J. B. Cornell.

Metal Lathing.

No. 576.

Reissued Aug. 3, 1868.

UNITED STATES PATENT OFFICE.

JOHN B. CORNELL, OF NEW YORK, N. Y.

IMPROVEMENT IN CONTINUOUS SHEET-METAL LATHING SURFACES.

Specification forming part of Letters Patent No. 14,854, dated May 13, 1856; Reissue No. 576, dated August 3, 1858.

*To all whom it may concern:*

Be it known that I, JOHN B. CORNELL, of the city, county, and State of New York, have invented a Close and Continuous Plaster-Supporting Metallic Surface, which I design to use in the formation of fire-proof and burglar-proof plastered partitions, ceilings, &c.; and I do hereby declare that the following is a full and exact description thereof, reference being had to the accompanying drawings, making a part of this specification—

Figure 2:
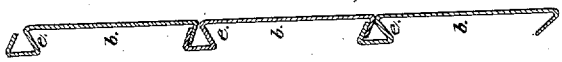
Figure 1:
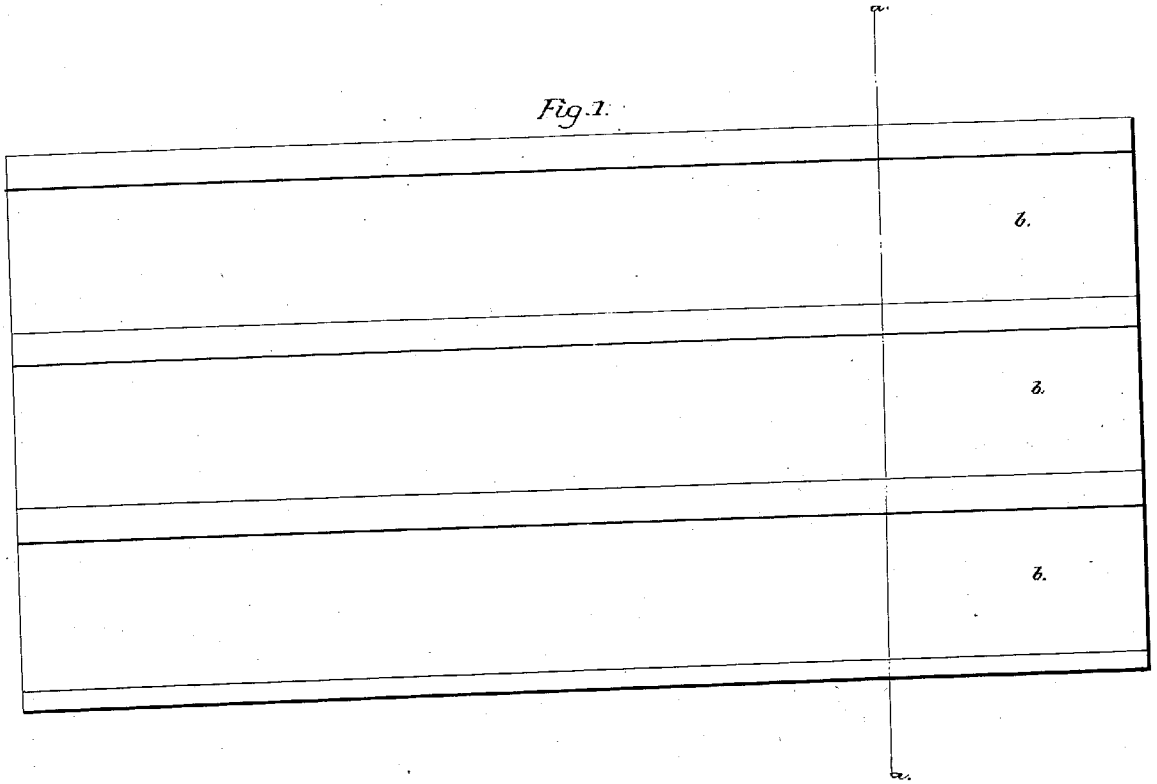

Figure 1 being a side view of a portion of the said plaster-supporting metallic surface, composed of united sections *b b* of swaged sheet metal; and Fig. 2 is a transverse section in the line *a a* of Fig. 1.

My improved plaster-supporting metallic surface is composed of sheets of iron or other suitable metal after they have been swaged or bent into such a shape as to form inwardly-enlarged cavities or recesses for the reception and safe retention of plaster, &c., and then secured to suitable studs or beams in such a manner as to leave no openings in said surface for the plaster to pass through and form retaining locks on the rear side of the same. The said sheets may be combined in any suitable manner to the requisite studs or supporting-beams in the process of forming fire-proof partitions, ceilings, &c.

The partition or ceiling which is in part formed by my close and continuous plaster-supporting metallic surface, it will readily be perceived, must be every way safer and more secure than a partition or ceiling whose plastered surface is supported by narrow metallic strips arranged with intervals between their edges for the plaster to pass through and lock upon the inner surfaces of the same. The said detached metallic strips can easily be removed by a burglar without making much noise, and they afford no better protection against fire than the ordinary wooden laths.

The accompanying drawings represent a suitable shape for the sheets composing my plaster-supporting metallic surface, and also a convenient method of combining a series of said sheets with each other; but I wish it to be distinctly understood that I do not limit myself to any particular shape of the sheets of which my improved plaster-supporting surface may be composed, nor to any precise method of uniting said sheets with each other, provided the said sheets are so shaped as to form recesses for the reception and retention of the mortar or plaster, and are so combined with each other, and with their supports as to form a continuous metallic surface over said support.

What I claim as my invention, and desire to secure by Letters Patent, is—

A closely-united plaster supporting metallic surface of substantially the shape herein described, when used in the construction of partitions, &c., which are designed to be fire-proof and burglar-proof.

JOHN B. CORNELL.

Witnesses:

A. A. JAYNE,
C. H. FIELD.